US006913239B2

(12) United States Patent
Nortier

(10) Patent No.: US 6,913,239 B2
(45) Date of Patent: Jul. 5, 2005

(54) VALVE SEAT FOR PISTON-TYPE FLUSHOMETER

(75) Inventor: Richard A. Nortier, Westchester, IL (US)

(73) Assignee: Sloan Valve Company, Franklin Park, IL (US)

(*) Notice: Subject to any disclaimer, the term of this patent is extended or adjusted under 35 U.S.C. 154(b) by 43 days.

(21) Appl. No.: 10/691,990

(22) Filed: Oct. 23, 2003

(65) Prior Publication Data

US 2005/0087709 A1   Apr. 28, 2005

(51) Int. Cl.[7] ............................................. F16K 31/12
(52) U.S. Cl. ........................ 251/40; 251/29; 251/30.01
(58) Field of Search ........................ 251/28, 29, 30.01, 251/33, 38, 40, 41

(56) References Cited

U.S. PATENT DOCUMENTS 3,778,023 A * 12/1973 Billeter .................. 251/30.01
6,299,127 B1 * 10/2001 Wilson ........................ 251/38
6,408,873 B1 * 6/2002 Hall et al. .................. 137/550

* cited by examiner

Primary Examiner—Justine R. Yu
Assistant Examiner—John K. Fristoe, Jr.
(74) Attorney, Agent, or Firm—Cook, Alex, McFarron, Manzo, Cummings & Mehler, Ltd.

(57) ABSTRACT

A flush valve includes a body having an inlet, an outlet and a main seat assembly between the inlet and outlet. A piston moves within the body and with the body defines a pressure chamber which is used to normally maintain the piston closed upon the main seat assembly. There is a refill orifice in the piston connecting the pressure chamber with the inlet. A relief valve is carried by the piston for venting the pressure chamber and there is a fluid driven apparatus for opening the relief valve, which apparatus is attached to the body. A hydraulic bypass in the body is connected to the fluid driven apparatus. The main seat assembly has a plurality of peripherally disposed fluid passages connecting the hydraulic bypass and the inlet to provide filtered fluid to the fluid driven apparatus. A first seal on the main seat assembly has a flat portion and an arcuate portion constrained within a channel. Lockout lugs formed in the seal prevent installation of an incorrectly sized piston.

40 Claims, 3 Drawing Sheets

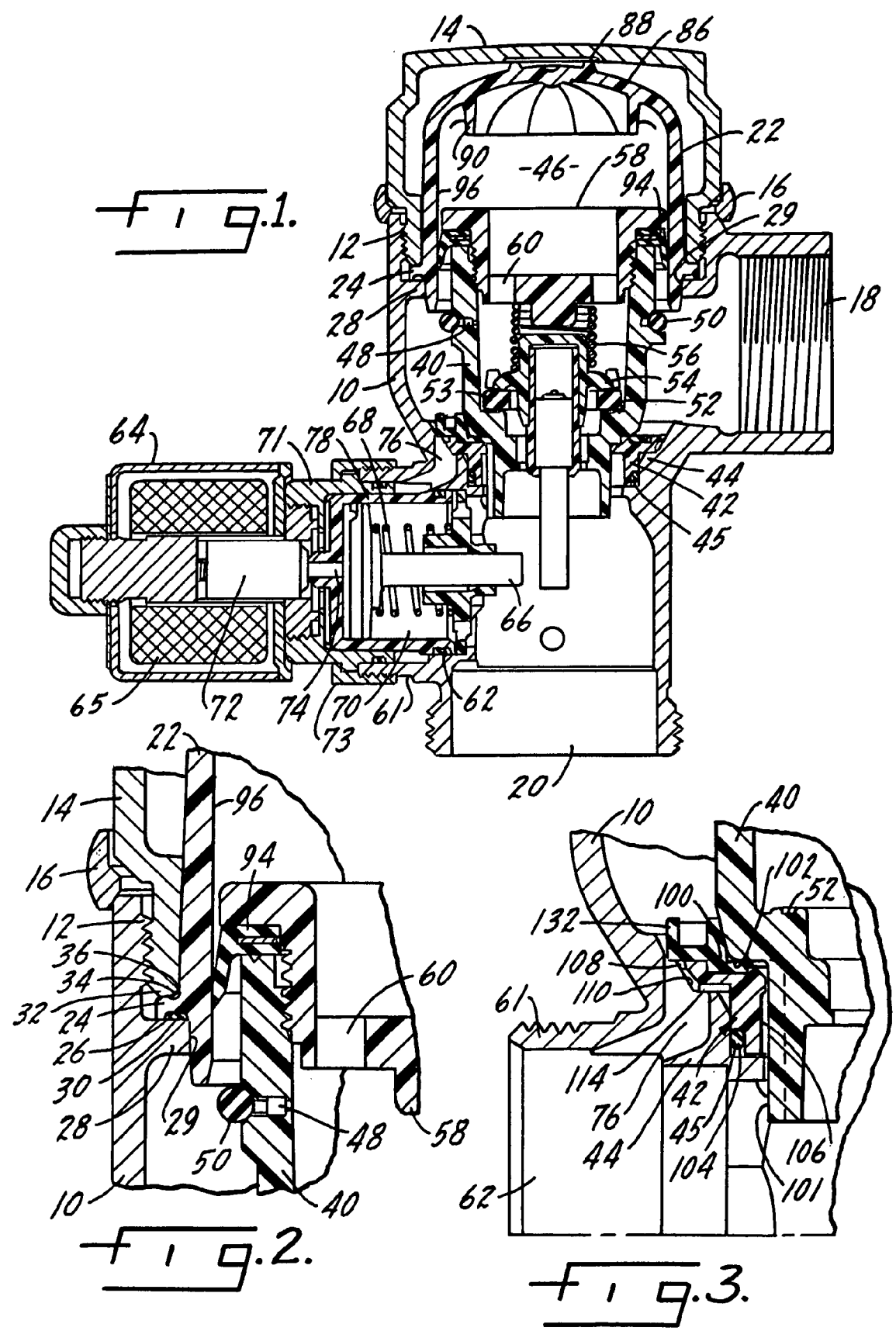

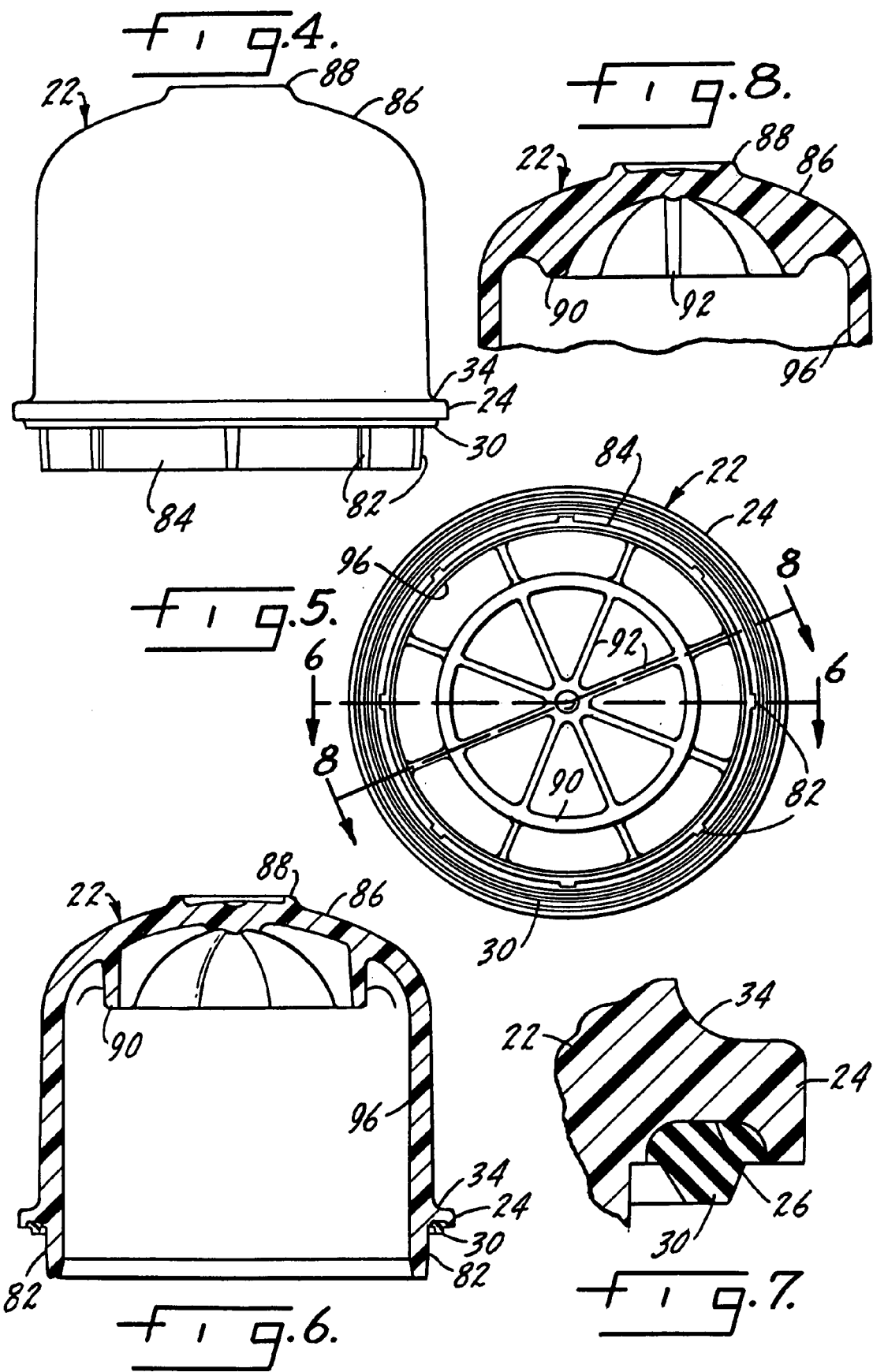

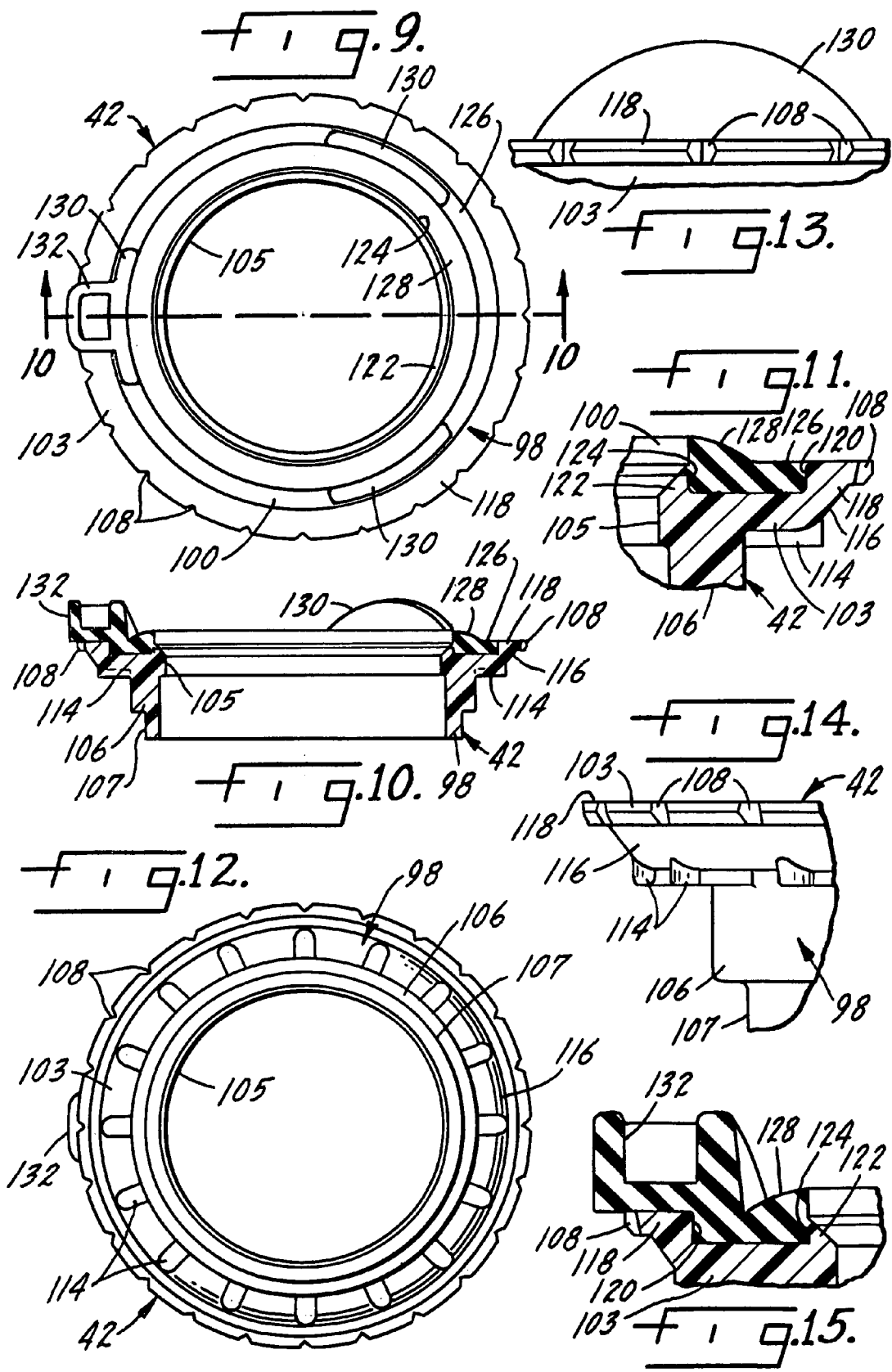

VALVE SEAT FOR PISTON-TYPE FLUSHOMETER

BACKGROUND OF THE INVENTION

The present invention relates to piston-type flush valves for toilets and urinals and more specifically to an improvement in the valve seat which both provides a better seal for the piston and provides a fluid passageway between the flush valve inlet and the solenoid-operated fluid piston.

U.S. Pat. Nos. 5,881,993 and 4,261,545, among other patents, all owned by Sloan Valve Company, show piston-operated flush valves for use in flushing toilets and urinals. In each of these patents there is a piston which closes upon a valve seat in the flush valve body. U.S. Pat. No. 6,299,127, also owned by Sloan Valve Company, shows a solenoid-operated, hydraulically-driven piston for tripping the relief valve in a diaphragm-type flush valve and that type of flush valve actuator is used in the presently-disclosed piston operated flush valve. The present invention is specifically directed to an improved valve seat which provides communication between the flush valve inlet and the water passage leading to the solenoid-operated, hydraulically-driven flush valve actuator. The seat further has a new and effective seal between it and the flush valve piston, all of which are directed to a more effective and efficient piston-type flush valve.

SUMMARY OF THE INVENTION

The present invention relates to piston-operated flush valves for use in connection with toilets and urinals, and more specifically, to an improvement in the valve seat for such flush valves which have a hydraulically-driven actuating apparatus.

A primary purpose of the invention is a piston-type flush valve for the use described including an improved seat having a plurality of peripherally disposed water passages for providing filtered water from the flush valve inlet to the hydraulically-driven actuator.

Another purpose of the invention is a flush valve as described in which the flush valve seat has the water passages generally in the same plane as the piston seal so as to insure flushing of the water passages when the valve is open.

A further purpose of the invention is a flush valve of the type described in which the flush valve seat has upraised fingers or lugs which preclude installation of an improperly sized piston.

Still another purpose of the invention is a flush valve as described in which the flush valve seat has a molded seal whose geometry provides a higher initial sealing stress by creating a line contact with the bottom of the piston.

Yet another purpose of the invention is a flush valve having a hydraulic bypass for supplying filtered water from the flush valve inlet to the hydraulically-driven actuator, with the bypass being located so as not to interfere with the static seal of the flush valve seat.

These and other desired benefits of the invention, including combinations of features thereof, will become apparent from the following description. It will be understood, however, that a device could still appropriate the claimed invention without accomplishing each and every one of these desired benefits, including those gleaned from the following description. The appended claims, not these desired benefits, define the subject matter of the invention.

BRIEF DESCRIPTION OF THE DRAWINGS

FIG. 1 is a vertical section through a flush valve of the present invention.

FIG. 2 is an enlarged partial section showing the connection between the flush valve body, the inner cover and the outer cover.

FIG. 3 is an enlarged partial section illustrating the relationships among the valve body and its water passage, the main seat assembly, and the piston, with the actuator assembly and relief valve removed for clarity.

FIG. 4 is a side elevation view of the inner cover.

FIG. 5 is a bottom plan view of the inner cover.

FIG. 6 is a section taken along line 6—6 of FIG. 5.

FIG. 7 is an enlarged detail section of the flange and seal of the inner cover.

FIG. 8 is a partial section taken along line 8—8 of FIG. 5.

FIG. 9 is a top plan view of the main seat assembly.

FIG. 10 is a section taken along line 10—10 of FIG. 9.

FIG. 11 is an enlarged detail section of the sealing portion of the main seat assembly.

FIG. 12 is a bottom plan view of the main seat assembly.

FIG. 13 is a partial enlarged side elevation view of the main seat assembly showing one of the lockout lugs.

FIG. 14 is a partial enlarged side elevation view of the main seat.

FIG. 15 is a partial enlarged section of the main seat assembly showing an extension on one of the lockout lugs.

DETAILED DESCRIPTION OF THE INVENTION

The present invention relates to improvements in piston-type flush valves such as those illustrated in U.S. Pat. Nos. 4,261,545 and 5,881,993, both owned by Sloan Valve Company of Franklin Park, Illinois. The disclosures of both patents are incorporated by reference herein. Additional reference should be made to U.S. Pat. No. 6,299,127, also owned by Sloan Valve Company, and illustrating a solenoid-operated flush valve. The invention will be described in connection with solenoid operation, but it is also equally adapted for manual handle operation as shown in the '545 and '993 patents. The disclosure of the '127 patent is incorporated by reference herein. When the flush valve shown herein is arranged for manual operation the water passage between the valve seat and the hydraulic actuator will be closed.

As illustrated in FIGS. 1–3, the flush valve includes a body 10 having an upper interior thread 12 to which is threaded an outer cover 14. A decorative filler ring 16 may encircle the body 10 and outer cover 14 at the intersection of these two parts. The body 10 has an inlet 18 which will be connected to a suitable source of supply water and an outlet 20 which will be connected to either a toilet or a urinal.

Within the outer cover 14 there is an inner cover 22 which at its lower end has an outwardly extending flange 24. An undercut recess 26 (FIG. 2) is formed on the underside of the flange 24. The flange 24 rests upon an inwardly-directed ledge 28 of the body 10. The ledge has an internal axial surface 29. A seal 30 is positioned within the recess 26 to form an exterior seal for the flush valve body. The lower end 32 of the outer cover 14, after being connected to the body at the threads 12, will bear against the top of the flange 24 to lock the inner cover 22 firmly in position on the flush valve body and within the outer cover 14.

Focusing on FIG. 2, the inner cover 22 has a small radius 34 at the junction between the flange 24 and the cover which matches an outer radius 36 on the bottom of the end 32 of the outer cover 14 so as to provide stress relief at the junction between these two elements. Such radii reduce stress on the flange which might otherwise crack or gouge this portion of the inner cover.

Positioned within the body 10 and the inner cover 22 is a piston 40 which is urged toward a filtering main seat assembly 42. The main seat assembly is located between the inlet and outlet on a shoulder 44 of the valve body 10. The shoulder 44 has a radial top land and a cylindrical internal sealing wall 45. The piston 40 will be biased toward the main seat assembly 42 by water within a pressure chamber 46. Water passes into the chamber 46 from the inlet 18 through a refill orifice 48 in the side wall of the piston 40. The refill orifice is covered by an O-ring 50. Details of this structure are shown in the above-referenced U.S. Pat. No. 4,261,545 patent.

The interior of the piston 40 includes a seat 52 upon which rests a seal 53 and a relief valve 54. The relief valve is urged to this position by a spring 56 which bottoms, at its lower end, upon the relief valve 54, and at its upper end against a stop 58. The stop 58 is threaded into the top of the piston 40. The stop 58 has openings 60 through it which provide fluid communication between the refill orifice 48 and the pressure chamber 46.

The flush valve body 10 has an annulus 61 which defines an opening 62 in which an actuator assembly 64 is mounted. The actuator assembly will effect movement of the relief valve 54 in a manner described in the above-referenced patents. The actuator assembly 64 includes a solenoid 65 which can move a reciprocable plunger 72. The plunger normally closes a passage 74 which extends through the otherwise closed end of a cup 78. The cup is held in the opening 62 by a sleeve 71 which has a radial extension that engages the closed end of the cup. The sleeve 71 is clamped to the annulus 61 by a nut 73. The cup 78 defines a chamber 70 in which resides a reciprocable, fluid-driven piston/rod assembly 66. A spring 68 biases the piston/rod assembly 66 to the normal, retracted position shown in FIG. 1.

The sleeve 71 is sealed on its outer surface to the inner surface of the annulus 61 but the sleeve is not sealed on its inner surface to the cup 78. This permits water to flow between the sleeve and cup. Accordingly, the passage 74 in the end of the cup is in fluid communication with a hydraulic bypass 76 formed in the flush valve body. The bypass 76 receives water flowing from the inlet 18 through the filtering main seat assembly 42 as described hereinafter. Under normal conditions, water will leak between the exterior of the cup 78 and the interior of the sleeve 71 and be directly adjacent the passage 74. When the solenoid 65 is activated it pulls its plunger 72 away from passage 74. Water which has passed around the cup 78 will flow through the passage 74, causing the piston/rod assembly 66 to move against the force of spring 68 and tilt the relief valve 54. Tilting of the relief valve vents pressure within chamber 46 to the outlet 20. Water pressure at the inlet 18 acting on the piston 40 is then no longer counterbalanced by pressure within chamber 46 so the inlet pressure causes the piston to rise off of the main seat assembly 42. This provides an uninterrupted fluid path between the inlet 18 and the outlet 20. As water flows through the refill orifice 48, pressure in chamber 46 is reestablished, which gradually forces the piston back down on the main seat assembly, thereby reclosing the valve. The operation, as described, is more fully disclosed in the above-mentioned U.S. patents owned by Sloan Valve Company.

The inner cover 22 is more specifically shown in FIGS. 4–8. The inner cover includes the aforementioned outwardly-extending flange 24, beneath which are a plurality of outwardly-extending axial ribs 82 which extend from a peripheral wall 84. The ribs 82 engage the axial surface 29 of the inwardly-directed ledge 28 to center the cover 22 within the body 10. This in turn centers the internal wall of the inner cover with the attendant sealing benefit described below.

As illustrated, the top 86 of the inner cover is domed, providing additional strength to resist the pressure within chamber 46. At the center of the dome 86 there is an outwardly-extending ring 88 which, as shown in FIG. 1, is in contact with the inside of the outer cover 14. There is a controlled clearance between the top of ring 88 and the inside surface of the outer cover to insure the maximum clamp load is directly applied to the seal 30 at the inwardly-directed ledge 28. As pressure increases to a sufficient amount, well above 100 psi, the inside cover will expand to contact the outer cover which will then limit further expansion.

The interior surface of the inner cover's top 86 has a downwardly-extending annular projection 90. This projection functions as a stop to limit upward movement of the piston 40. The stop 58 on the piston 40 will move upwardly during operation, but the piston's upward movement will be limited by the projection 90. The stroke of the piston assists in determining the duration of time during which the flush valve will provide a fluid connection between the inlet and the outlet. The ring 90 is reinforced by a plurality of radial ribs 92 shown particularly in FIGS. 5 and 8.

As best seen in FIG. 2 the piston 40 has a seal 94 which is carried by the piston and which bears against the inner wall 96 of the inner cover 22. This seal establishes the pressure chamber 46. The seal will move against the inside wall 96 as the piston moves between the open and closed positions during flush valve operation.

One of the advantages of the inner cover as described and shown herein is that it isolates the outer cover from water contact, allowing the outer cover to be made of a less expensive material. Further, the ribs 82 improve alignment of the piston and piston seal within the flush valve body, thereby improving reliability of the valve. An additional advantage is that the seal between the valve body 10 and the cover may be easily renewed by replacing the inner cover.

It is preferred that the inner surface of the inner cover wall 96 have a degree of texture. The surface should not be so smooth that the lip seal of the piston will stick and act erratically, nor can it be so rough as to not provide for a complete seal between the piston and the inner cover. It is preferred that the finish on the inner cover have a surface roughness in the range of about 8 microinches to about 32 microinches.

FIGS. 3 and 9–15 illustrate in detail the filtering main seat assembly 42. The main seat assembly is located between the inlet 18 and the outlet 20. Its principal functions are to form a semi-dynamic closing seal with the piston 40, to form a static seal with the valve body, to guide the piston during its operation, and to filter inlet water going into the bypass 76 for hydraulic assist with the actuator assembly. The main seat assembly 42 has two primary components, a main seat filter 98 and a sealing surface 100. Preferably the sealing surface 100 is molded directly in place on the main seat filter 98. The sealing surface 100 is engageable with a radial surface 102 (FIG. 3) of the piston to form the semi-dynamic seal between the piston 40 and the main seat assembly 42. The piston also has a skirt 101 which centers the piston in the main filter seat.

The main seat filter 98 is made of a material that is relatively rigid compared to the material of the sealing surface 100. By way of example only, the main seat filter may be made of polypropylene which is 30% glass filled, while the sealing surface may be made of a synthetic elastomer, such as that sold by Advanced Elastomer Systems, under their trademark Santoprene®. It will be realized that other suitable materials could be used.

The main seat filter 98 includes an annular ring portion 103 that defines a central opening 105. The main seat filter also has a lower, cylindrical portion 106 that extends downwardly from the ring 103. An undercut notch 107 (FIGS. 10 and 14) at the bottom of the cylindrical portion 106 receives an O-ring 104 (FIG. 3) which forms a static seal with the internal sealing wall 45 of the valve body shoulder 44 to eliminate leakage at this point in the valve body. The ring 103 has a plurality of v-notches or grooves 108 at its periphery which are directly adjacent the valve body portion 110 (FIG. 3). Together the grooves 108 and body portion 110 define a plurality of small, filter-like passages whose collective total flow area is larger than that of the flow area defined by plunger 72 when activated and passage 74. As shown herein, there may be twenty-four such filtering grooves 108, although that exact number is not essential to the invention. The grooves 108 are positioned such that as the valve cycles, the inrush of water will wash away any large debris which may have accumulated in the grooves 108, further reducing the chances of the filter passages becoming blocked.

The main seat filter 98 also contains a plurality of landing pads 114 on a lower surface 116 of the ring 103. The pads function as a positive stop when installing the seat onto the top land of the valve body's shoulder 44. The pads further cooperate with the portion 110 of the valve body to define a flow passage about the periphery of the ring 103 of the main seat filter 98. This flow passage connects the bypass 76 with the inlet supply water so that the flush valve may function correctly when the solenoid is operated.

It can be seen that the bypass 76 is downstream of the filter formed by the ring 103 and its grooves 108, but the bypass is upstream of the seal 104. Thus, inlet water can go through the filter and bypass 76 to get to the actuator assembly 64, but inlet water cannot get around the main seat assembly to the outlet 20, except when the valve is intentionally activated.

It has been found advantageous to form the hydraulic bypass 76 by casting it in place in the valve body 10. This avoids the need for a secondary drilling operation during manufacture of the valve body. Furthermore, the bypass 76 should be arranged such that it does not intersect with the sealing wall 45 of the shoulder 44. By spacing the bypass from the shoulder, well outside of any sealing areas, the potential for damage to the main seat assembly's seal ring 104 during installation is avoided. That is, because the bypass does not open in the area of the sealing wall 45, it cannot present any sharp edges or burrs that could otherwise have the potential to cut or damage the seal ring as the ring is moved past the bypass during installation.

FIGS. 9–15 illustrate further details of the main seat assembly 42. The ring 103 and sealing surface 100 have a geometry specifically tailored for this application. The shape of the sealing surface cooperates with that of the ring to provide the desired performance. Specifically, the upper surface of the ring 103 has an upstanding sill 118 about its periphery. The grooves 108 are formed at the outer edge of the sill. The inner edge of the sill forms a first axial wall 120. The upper surface of the ring 103 further includes an upstanding rib 122 which is generally trapezoidal in cross section. That is, the top edge of the rib does not form a sharp point but rather is shaved off slightly to form a radial top edge. The rib has a second axial wall 124. Together the first and second axial walls 120, 124 define a channel on top of the ring 103. A majority of the sealing surface 100 is disposed within the channel. It is important that the sealing surface be bounded by the axial walls so that deformation of the sealing surface in a radial direction is limited.

The upper face of the sealing surface 100 includes a flat base 126 and an upstanding, arcuate crown 128. The crown is radially inward of the base. This profile provides a higher initial sealing stress by creating a line contact with the radial surface 102 on the piston. Thus, a seal will be created at even the lowest of water pressures. This profile also maintains a high spring constant which limits compression of the sealing surface. As the water pressure increases the crown 128 will deform slightly which increases the sealing area on the piston. But due to the constraints in the geometry, the sealing area will never exceed a desired limit. Even if the crown were to flatten out completely, the contact area will be less than in prior seals, thereby maintaining the desired high seal stress, and the seat will be compressed less than prior designs, thereby allowing more consistent flushing. The compression of the sealing surface is limited by the mechanical stiffness of the elastomeric material and the area free to expand. The area free to expand is governed by the sealing surface's geometry and that of the ring 103. Specifically, the first and second axial walls 120, 124 define the channel in which the base 126 of the seal resides. These walls limit the area of the sealing surface that is free to expand. Another advantage of the crown 128 and thickness of the base 126 is it counteracts the tendency of the sealing surface material to take a set after it has been under compression.

By way of example only and not by way of limitation, an acceptable profile of the sealing surface 100 has been made with the following approximate dimensions. The diameter of the first axial wall 120 is about 1.43 inches. The height of the axial wall, and thus the thickness of the base 126, is about 0.045 inches. The diameter of the second axial wall 124 is about 1.06 inches while its height is 0.025 inches. The curvature of the crown 128 has a radius of about 0.25 inches.

The base portion 126 of the sealing surface is interrupted by a set of raised lockout lugs 130. As seen in FIG. 15, the lugs have a height greater than that of the crown 128. The height of the lugs, together with the diameter of the base 126 on which they are located, causes the lugs to interfere with the seating of older pistons on the sealing surface. The older style pistons have a ring that will contact the lugs and prevent the such pistons from closing the valve. Such older style pistons are not to be used because they allow more water per flush than permitted by current codes. However, the lugs 130 will not interfere with the correctly-sized piston 40. The radial surface 102 of piston 40 has a diameter that allows it to fit inside of the lugs 130 and in engagement with the crown 128 of the sealing surface. The lugs 130 are molded into the sealing surface in such a manner that if one attempted to remove them it wold very likely lead to destruction of the critical sealing surface. The lugs are shaped to create a minimal flow restriction when the piston is unseated. One of the lugs has an extension 132 that will partially cover the bypass 76. This extension forces the water to be filtered by the v-notches or grooves 108.

It will be noted that the structure described provides for precise alignment of the piston's dynamic seal 94 with the inside wall 96 of the inner cover. This alignment is ultimately dependent on the axial sealing wall 45 and the axial surface 29 of the ledge 28 being concentric. These surfaces are carefully controlled during manufacture of the body to be concentric. The lower cylindrical portion 106 of the main seat assembly 42 will then fit inside the wall 45 and assure alignment of the opening 105. The piston skirt 101 guides the piston in the opening 105 to precisely locate the seal 94. Similarly, the centering ribs 82 on the cover will fit inside the axial surface of the ledge 28 to precisely locate the inside wall 96 of the inner cover 22.

While the preferred form of the invention has been shown and described herein, it should be realized that there may be many modifications, substitutions and alterations thereto. For example, if a conventional, manually-operated handle were installed instead of the solenoid-operated actuator 64, the bypass 76 may be plugged.

I claim:

1. A flush valve comprising a body defining a pressure chamber and having an inlet and an outlet, a main seat assembly between said inlet and outlet, a piston movable within the body, a refill orifice in the piston providing fluid communication between the inlet and the pressure chamber, pressure in the pressure chamber maintaining the piston closed upon the main seat assemmbly, a relief valve carried by the piston for venting the pressure chamber, a fluid-driven actuator attached to the body for selectably opening the relief valve, a hydraulic bypass in the body providing fluid communication between the inlet and the fluid-driven actuator, said main seat assembly having a plurality of fluid passages providing fluid communication from the inlet to the hydraulic bypass to provide fluid to the fluid-driven actuator.

2. The flush valve of claim 1 wherein the fluid passages include a plurality of uniformly arranged grooves on the outer periphery of the main seat assembly.

3. The flush valve of claim 1 wherein the main seat assembly further comprises a main seat filter and a sealing surface on an upper surface of the main seat filter, the sealing surface being in contact with the piston when the flush valve is in a closed position.

4. The flush valve of claim 3 wherein the sealing surface comprises an arcuate crown.

5. The flush valve of claim 4 wherein the sealing surface further comprises a flat base.

6. The flush valve of claim 3 wherein the main seat filter comprises an annular ring, the ring including a sill having a first axial wall and a rib having a second axial wall, the first and second walls and the ring defining a channel, with at least a portion of the sealing surface being disposed in the channel.

7. The flush valve of claim 6 wherein the sealing surface comprises a flat base disposed within the channel such that radial expansion of the base is limited by said first and second axial walls.

8. The flush valve of claim 7 wherein the sealing surface further comprises an arcuate crown that extends at least partially above the annular ring of the main seat filter.

9. The flush valve of claim 8 wherein the arcuate crown is located radially inwardly of the outer periphery of the flat base.

10. The flush valve of claim 6 wherein the pads define a flow passageway about the periphery of the main seat assembly for fluidly connecting the hydraulic bypass and the fluid passages.

11. The flush valve of claim 3 wherein the sealing surface further comprises at least one lockout lug positioned to prevent seating of a piston having a radial surface of incorrect diameter.

12. The flush valve of claim 3 wherein the sealing surface comprises an extension positioned to at least partially cover said hydraulic bypass, thereby requiring water flowing to the bypass to be filtered by the fluid passages.

13. The flush valve of claim 3 wherein the sealing surface is integrally molded on the main seat filter.

14. The flush valve of claim 3 wherein the fluid passages include a plurality of uniformly arranged grooves on the outer periphery of the main seat filter and the grooves are in substantially the same plane as the sealing surface whereby when the piston moves away from the main seat assembly water from the valve inlet will wash the grooves to remove any debris therein.

15. The flush valve of claim 1 wherein the main seat assembly carries a static seal at a lower peripheral portion thereof in contact with the flush valve body, the static seal being downstream of the hydraulic bypass.

16. The flush valve of claim 1 wherein the body includes an inwardly-directed shoulder, the main seat assembly being supported on the shoulder, the main seat assembly including a plurality of peripherally disposed, downwardly-extending pads which are engageable with the shoulder.

17. A flush valve comprising a body defining a pressure chamber and having an inlet and an outlet, a main seat assembly between said inlet and outlet, a piston movable within the body, a refill orifice in the piston providing fluid communication between the inlet and the pressure chamber, pressure in the pressure chamber maintaining the piston closed upon the main seat assembly, a relief valve carried by the piston for venting the pressure chamber, an actuator attached to the body for selectably opening the relief valve, the main seat assembly further comprising a main seat filter and a sealing surface on an upper surface of the main seat filter, the sealing surface being in contact with the piston when the flush valve is in a closed position and the sealing surface including an arcuate crown.

18. The flush valve of claim 17 wherein the sealing surface further comprises a flat base.

19. The flush valve of claim 18 wherein the main seat filter comprises an annular ring, the ring including a sill having a first axial wall and a rib having a second axial wall, the first and second walls and the ring defining a channel, with at least a portion of the sealing surface being disposed in the channel.

20. The flush valve of claim 19 wherein the flat base is disposed within the channel such that radial expansion of the base is limited by said first and second axial walls.

21. The flush valve of claim 20 wherein the arcuate crown extends at least partially above the annular ring of the main seat filter.

22. The flush valve of claim 18 wherein the arcuate crown is located radially inwardly of the outer periphery of the flat base.

23. The flush valve of claim 17 wherein the sealing surface further comprises at least one lockout lug positioned to prevent seating of a piston having a radial surface of incorrect diameter.

24. The flush valve of claim 17 wherein the sealing surface is integrally molded on the main seat filter.

25. The flush valve of claim 17 wherein the body includes an inwardly-directed shoulder, the main seat assembly being supported on the shoulder, the main seat assembly including a plurality of peripherally disposed, downwardly-extending pads which are engageable with the shoulder.

26. A flush valve comprising a body defining a pressure chamber, the body having an inlet, an outlet and a shoulder therebetween, the shoulder defining an internal sealing wall, a main seat assembly disposed between said inlet and outlet and having a static seal engageable with said internal sealing wall, a piston movable within the body, a refill orifice in the piston providing fluid communication between the inlet and the pressure chamber, pressure in the pressure chamber maintaining the piston closed upon the main seat assembly, a relief valve carried by the piston for venting the pressure chamber, a fluid-driven actuator attached to the body for selectably opening the relief valve, a hydraulic bypass in the body providing fluid communication between the inlet and the fluid-driven actuator, said main seat assembly having at least one fluid passage providing fluid communication from the inlet to the hydraulic bypass to provide fluid to the fluid-driven actuator, the hydraulic bypass being located so as to be spaced from the internal sealing wall of the shoulder.

27. The flush valve of claim 26 wherein the fluid passage includes a plurality of uniformly arranged grooves on the outer periphery of the main seat assembly.

28. The flush valve of claim 27 wherein the main seat assembly further comprises a main seat filter and a sealing surface on an upper surface of the main seat filter, the sealing surface being in contact with the piston when the flush valve is in a closed position.

29. The flush valve of claim 28 wherein the sealing surface comprises an arcuate crown.

30. The flush valve of claim 29 wherein the sealing surface further comprises a flat base.

31. The flush valve of claim 28 wherein the main seat filter comprises an annular ring, the ring including a sill having a first axial wall and a rib having a second axial wall, the first and second walls and the ring defining a channel, with at least a portion of the sealing surface being disposed in the channel.

32. The flush valve of claim 31 wherein the sealing surface comprises a flat base disposed within the channel such that radial expansion of the base is limited by said first and second axial walls.

33. The flush valve of claim 32 wherein the sealing surface further comprises an arcuate crown that extends at least partially above the annular ring of the main seat filter.

34. The flush valve of claim 33 wherein the arcuate crown is located radially inwardly of the outer periphery of the flat base.

35. The flush valve of claim 28 wherein the sealing surface further comprises at least one lockout lug positioned to prevent seating of a piston having a radial surface of incorrect diameter.

36. The flush valve of claim 28 wherein the sealing surface comprises an extension positioned to at least partially cover said hydraulic bypass, thereby requiring water flowing to the bypass to be filtered by the fluid passages.

37. The flush valve of claim 28 wherein the sealing surface is integrally molded on the main seat filter.

38. The flush valve of claim 28 wherein the grooves are in substantially the same plane as the sealing surface whereby when the piston moves away from the main seat assembly water from the valve inlet will wash the grooves to remove any debris therein.

39. The flush valve of claim 26 wherein the hydraulic bypass is cast into the body.

40. The flush valve of claim 26 wherein the internal sealing wall is located radially inwardly of the hydraulic bypass.

* * * * *